United States Patent
Tschift

[11] 4,029,178
[45] June 14, 1977

[54] HIGH-IMPACT FORCE DAMPING DEVICE

[75] Inventor: Ludwig Tschift, Vienna, Austria

[73] Assignee: Siemens Aktiengesellschaft, Munich, Germany

[22] Filed: Apr. 17, 1974

[21] Appl. No.: 461,758

[30] Foreign Application Priority Data
Apr. 19, 1973 Germany .......................... 2320258

[52] U.S. Cl. .............................................. 188/1 C
[51] Int. Cl.² .......................................... F16F 7/12
[58] Field of Search ................. 188/1 C; 293/1, 70

[56] References Cited
UNITED STATES PATENTS

| | | | |
|---|---|---|---|
| 2,275,573 | 3/1942 | Sturm et al. ..................... | 188/1 C |
| 3,298,465 | 1/1967 | Stastny ............................ | 188/1 C |
| 3,454,397 | 7/1969 | Yoshioka et al. ............... | 188/1 C X |
| 3,796,286 | 3/1974 | Kraupa ............................ | 188/1 C |
| 3,806,180 | 4/1974 | Patterson ....................... | 188/1 C X |

*Primary Examiner*—Duane A. Reger
*Attorney, Agent, or Firm*—Kenyon & Kenyon, Reilly, Carr & Chapin

[57] ABSTRACT

A high-impact force damping device is provided, particularly for the restraint of a pressurized-water reactor steam generator, to absorb and damp its impact force resulting from a break in its live steam output pipe line or reactor main pipe lines. The device is of the type relying on the plastic deformation of metal to absorb the impact force with a damping action preventing excessive rebound. To use this action, a substantially flat metal plate has one side supported by a suitable structure, and its other side provided with a bar having a width that is small as compared to that of the plate, this bar being made of metal that is harder than that of the metal plate, being in contact with the latter, and the bar being positioned to receive the impact force as by being positioned in the expected displacement path of the steam generator suffering a pipe line break accident. The plate and bar surfaces, at right angles to the direction of shock, are all mutually parallel with each other. The plate, its edges being unconfined, absorbs the shock force substantially in simple compression only and is made of metal having substantial resistance to plastic flow while possessing the characteristic of shifting sharply, when stressed, from elastic strain to plastic strain, iron and aluminum being examples.

4 Claims, 3 Drawing Figures

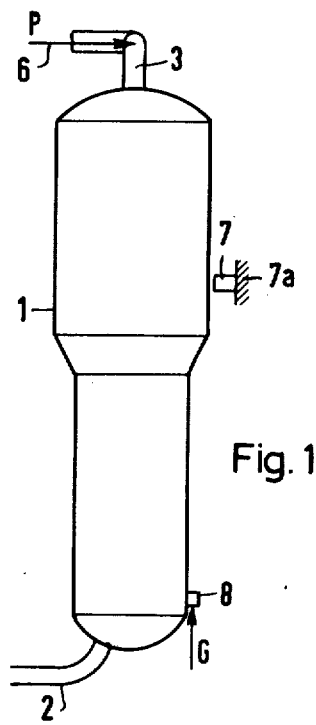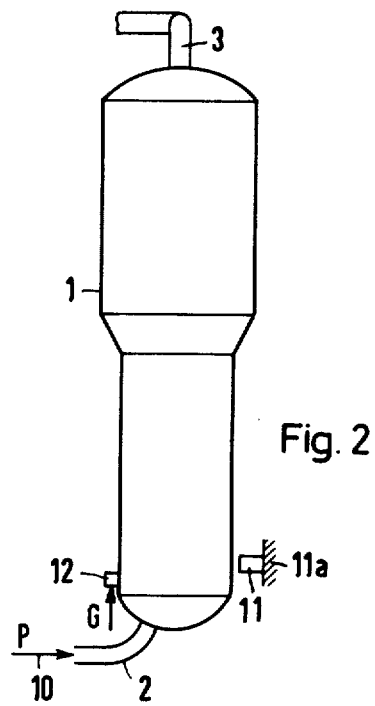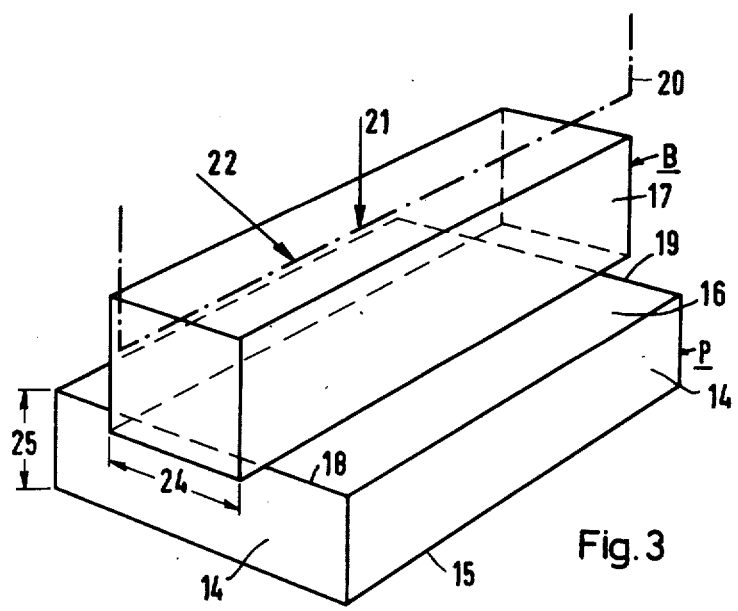

HIGH-IMPACT FORCE DAMPING DEVICE

BACKGROUND OF THE INVENTION

Prior art high-force impact damping devices have relied on the plastic deformation of metal, to which the impact force is transmitted, to absorb the shock force with a damping action avoiding the storage of energy in the form of resilience and which after absorption of the shock force, might cause a harmful release of energy in a direction opposite to that of the absorbed force.

One example, is U.S. Pat. No. 2,275,573 where the plastically deformable metal is made in the shape of a tube or hollow cone which is radially offset by penetration of a wedge-like member which receives the shock force. However, this involves such complicated calculations for determining the force absorption and damping effects, that for all practical purposes the action of the device cannot be estimated.

U.S. Pat. No. 3,209,864 discloses a device with a deformable metal in a pressure-resistant cylinder, an impact force receiving ram in the cylinder and engaging the metal acting to extrude the latter through passages. This arrangement is more adaptable to aircraft constructions, a pressure-resistant cylinder of adequate structural strength to be useful in the case of applications requiring the absorption and damping of very high impact forces becoming extremely expensive and involving great design complications.

To meet the conditions encountered in the case of nuclear reactor components involving extremely high impact forces, the German Offenlegungsschrift 2,060,794 suggests the use of a shock-absorbing and damping element made of aluminum or iron and arranged between a supporting structure and a head plate which receives the shock force. However, the head plate has a concave surface, the mating surface of the aluminum or iron member being correspondingly shaped, the intention being to accommodate forces directed not only axially with respect to the device, but also at various inclined angles as well. Therefore, this device also introduces difficulties in calculations such as are required to at least estimate the effects that will result when the operation of the device is required.

SUMMARY OF THE INVENTION

The object of the present invention is to produce a device or arrangement suitable for absorbing and damping very high impact forces, having a design permitting relatively easy calculation of the effects that will result when operation is required, and which will be inexpensive to manufacture and install. In this connection it must be remembered that since the present invention has nuclear installations in mind, that each pressurized-water reactor power plant conventionally includes four steam generators each having at least three vulnerable pipe connections so that the generator possibly requires a minimum of three of the impact absorbers. There are at present a large number of such power plants and the number is increasing constantly.

To attain this object, the present invention provides the plastically deformable metal, such as iron or aluminum substantially free from alloying components, including carbon in the case of iron, made in the form of a flat plate having mutually parallel front and back surfaces and adapted to be fixed to the structural support which is to provide the reaction to the impact force and which can be assumed to be substantially immovable for practical purposes. The impact receiving member or tool is in the form of a bar of rectangular cross section, of substantially less width than the width of the absorber plate and having a side in contact with the plate which is flat and parallel with this plate's front side which is contacted thereby. This bar is made of metal very substantially harder than that of the plate; preferably the bar is made from high carbon steel which has been hardened. Any attachment means used to connect the plate with its supporting structure should leave the edges of the plate entirely free around the entire periphery of the plate. Although of less width than the plate, the bar may be longer than the plate.

With this arrangement, when the bar receives the impact force from the steam generator, for example, it places the plate in simple compression. The edges of the bar do place the plate in shear but the bar has a width substantial enough so that the effect of this shear is negligible as compared to that of the simple compression.

With the plate in simple compression, its design as to thickness, and the design of the bar as to its width, permit relatively simplified calculations to provide an estimate of the absorbing and damping action to be expected, the impact force to be received from the steam generator being capable of calculation because of the known coolant and steam pressures.

Because the plate with its free and unconfined periphery is placed in simple compression, the iron or aluminum strains elastically up to the elastic limit of the metal in compression, and then shifts rather sharply to plastic deformation. Therefore, the force is initially taken up with the strain proportional to the stress, and then in a sharp manner shifts to a substantially constant strain rate as the stress increases. In other words, a stress-strain graph shows a sharp break as contrasted to a curve of relatively long radius representing a gradual change between elasticity and plasticity.

This sharp break is desirable and it may be accented. This is done during the manufacture of the device by forging the plate in simple compression, using a hardened steel tool simulating the impact receiving bar but having a very slightly greater width. This initial compression cold-works the plate metal to some extent at its surface, this precompression operation being done in the hydraulic press, for example, and with the plate receiving the work in simple compression by leaving its peripheral edges unconfined during the pressing operation. Thereafter, a portion of the plate's surface metal is machined off to a slightly greater extent than the thickness reduction effected by the press step.

BRIEF DESCRIPTION OF THE DRAWINGS

The preferred mode of carrying out this invention is illustrated by the accompanying drawings in which:

FIG. 1 in elevation shows a typical pressurized-water reactor steam generator and illustrating the conditions existing in the case of a break in the connection with the live steam output pipe line;

FIG. 2 is the same as FIG. 1 but illustrates the effects resulting in the case of a break in one of the main reactor coolant loop pipe lines; and FIG. 3 in perspective illustrates the salient features of the new absorber.

DETAILED DESCRIPTION OF THE INVENTION

FIG. 1 shows the steam generator at 1 with one of the main reactor coolant loop pipe lines shown at 2. There are, of course, two of such lines. The live steam output pipe line connection is shown at 3. The feed-water supply is not shown. In FIG. 1 it is assumed that the pipe line break is in the steam output line 3 and in the latter's horizontally extending portion. The escaping steam produces a reaction force in the direction of the arrow 6 forcing the steam generator at high velocity against its lateral support 7, the weight G of the steam generator being carried by its mounting bracket arrangement of which one is shown at 8. Normally the part 7 would represent one of the usual lateral steam generator supports characteristic of a conventional pressurized-water reactor power plant installation. Such a lateral support is substantially immovable because it is fixed to the reinforced concrete steel structure of the steam generator room of the plant's reactor building.

In the case of the steam line break, the steam generator strikes the lateral support 7 with great force, the steam generator being heavy, and with the break in the line 3 discharging steam horizontally at high pressure and large volume, very large forces are involved.

In FIG. 2 the break is assumed at the steam generator's primary or coolant connection 2, again in the latter's horizontally directed portion, the force in this case being in the direction of the arrow 10 with the impact being received by the lateral support 11, again an immovable object for practical purposes, the generator's mounting bracket arrangement being shown at 12 in this instance.

It can be seen that in both cases a pipe line break produces a lateral displacement, the direction of which can be predicted because it will be opposite to the direction of the fluid discharge at the break. Particularly in the case of the break in the coolant pipe connection, the impact force may run to hundreds of tons.

The impact force absorber and damper according to the present invention is illustrated in FIG. 3. In use, it replaces supports such as shown at 7 and 11 in FIGS. 1 and 2. The plate is shown at P. It may be made of aluminum or iron, in either instance in their dead soft condition free from alloys appreciably affecting their characteristics as elements. In FIG. 3 the construction is shown as though it were resting on a horizontal floor but it is to be understood that it would be vertically applied to the usual supporting structures of a steam generator room; incidentally, such supporting structures are shown at 7a and 11a in FIGS. 1 snd 2 respectively. The previously referred to bar is shown at B, it being this bar that would receive the impact from the steam generator in the event of an accident.

This plate P has a bottom side 15, which would be its supported side, all of its edges 14 being unconfined and free when the absorber is installed. Its top side 16 is parallel with its bottom side 15; the bar B, shown as being rectangular, has vertical sides 17 and what are in FIG. 3 top and bottom surfaces, substantially parallel with each other. At least the side of the bar engaging the surface 16 of the plate P should be mutually parallel. As shown, the width of the bar B is substantially less than that of the plate P, and to this extent the bar B forms an edge bearing against the plate. Longitudinally, the bar B is long enough to extend beyond both ends 18 and 19 of the plate. The absorber would ordinarily be oriented relative to the anticipated displacement of the steam generator to receive the impact force in a plane 20 at right angles to that of the plate surface 16, the direction of force being indicated by the arrow 21. However, within limits, inclined forces can also be accommodated as indicated by a force in the direction of the arrow 22.

As previously noted, the bar B is made of metal much harder than that of the plate P. The bar may be made of high carbon steel which has been hardened.

Preferably the plate P is made of aluminum which has been precompressed. Such precompression is done cold using a hardened steel tool simulating the bar 17 but having the latter's width 24 enlarged by approximately 5 mm. Using a suitable hydraulic press, for example, enough pressure is applied to this tool to cause it to penetrate the surface 16 for approximately 3 mm inwardly, and after this step, the thickness indicated at 25 of the plate P, is reduced by 5 mm by suitable machining, such as using a planing mill.

When the new absorber is assembled and vertically oriented, any means used to position the plate P or to connect the bar B should leave the peripheral edges of the plate P entirely or substantially free. Then when the bar B receives the impact force, it transmits this force to the plate P substantially in simple compression only. The length of the bar B is longer than that of the plate P, the bar overhanging the latter's ends 18 and 19. This eliminates shear action between the bar and the plate transversely with respect to the bar and permits the stress to travel longitudinally with respect to the bar, in the plate's surface 16. As previously indicated, shear stresses are small as compared to the compression. Although the precompression zone has been described as having a width 5 mm wider than that of the bar B, the main requirement is that the precompressed zone weight be at least as wide as the bar.

In operation with the bar B receiving the impact force, the plate P with its unrestrained periphery, is placed primarily in simple compression. Therefore, the desired force absorbing and damping action can be predicted relatively accurately by adjusting the size 25 of the plate and the width 24 of the bar approximately, using relatively simplified engineering calculations. The action obtained is an initial elastic restraint of the force which then breaks quickly and sharply into a restraint obtained by the plastic deformation of the metal of the plate. This provides an initial rapidly rising restraint and reduction in the velocity of the mass providing the force, followed by an inelastic restraint which, when the mass comes to a stand-still, is free from resiliency such as might cause its undesirably and possibly harmful rebound. This action is desirable and is particularly obtained in the case of the aluminum when precompressed as described.

What is claimed is:

1. A high-impact force absorbing and damping device comprising an element for receiving the impact and supported by a metal body which with increasing force strains elastically and then plastically; wherein the improvement comprises said body being in the form of a flat plate having free and unrestrained edges, and said element comprises an elongated bar made of metal harder than said metal body, said plate having a flat pressure-receiving side surface and said bar having a flat pressing side surface engaging said pressure-receiving surface, said bar's pressing surface being of substantially less width than said pressure-receiving surface, said plate being precompressed throughout the area of its said pressure-receiving surface engaged by said pressing surface of said bar.

2. The device of claim 1 in which said bar longitudinally overhangs said plate.

3. The device of claim 1 in which said bar and plate are rectangular in contour.

4. The device of claim 1 in which said pressure-receiving surface portion of said plate is precompressed to a lesser thickness than the balance of said plate and then reduced to a thickness less than said lesser thickness by removal of its metal.

* * * * *